Nov. 29, 1960 YASUSHI HOSHINO 2,962,558

APPARATUS FOR SUPPORTING A MAGNETIC SOUND RECORDING AND REPRODUCING HEAD IN A MAGNETIC SOUND RECORD READING MACHINE

Filed Jan. 2, 1958

United States Patent Office 2,962,558

Patented Nov. 29, 1960

2,962,558

APPARATUS FOR SUPPORTING A MAGNETIC SOUND RECORDING AND REPRODUCING HEAD IN A MAGNETIC SOUND RECORD READING MACHINE

Yasushi Hoshino, 462, 1-chome, Tamagawa-Okusawacho, Setagaya-ku, Tokyo, Japan

Filed Jan. 2, 1958, Ser. No. 706,871

5 Claims. (Cl. 179—100.2)

This invention relates to devices for supporting magnetic sound recording and reproducing heads in magnetic sound recording machines.

In conventional apparatus using tapes, a magnetic sound recording and reproducing head is generally mounted fixedly on a carrier and the head is contacted by the tape under tension. In such an apparatus, the tape is pulled by a relatively great force and describes an arc while in contact with the head. If the tension of tape is insufficient, the contact between the head and the tape will become unsatisfactory and the deterioration of quality of sound will be caused. This is emphasized since the tape has a tendency to roll due to being wound during storage and due to irregularities in thickness and imperfections of production. Accordingly it is necessary, when a head of conventional construction is used, to select carefully the base for the magnetic sound record film in order to obtain the smooth flat surface for the magnetic sound record film. From this reason, it has been considered heretofore that paper sheet is not suitable for use as the base and more expensive material is used.

In the case of a magnetic sound record sheet used on a magnetic sound record reading machine, the sheet has a relatively large size in width and length and it is difficult to stretch the sheet perfectly to place the sheet in flat smooth condition. Thus, the difficulty of maintaining intimate contact between the magnetic coating film of a sheet and a head is particularly great.

It is also to be noted that it is desirable to maintain elastic contact between the head and the magnetic sound record film in order to secure smooth recording and reproducing of sound. With respect to this consideration, it is desirable to have an elastic material for the base of the magnetic sound record film. However, elastic material generally has a rough surface and if a magnetic sound record film is coated on the rough surface of such a base sheet, the surface of the magnetic sound record film will be irregular to some extent.

According to the invention, a head which can move elastically in, for example, a vertical direction but which is fixed in horizontal direction is provided and all the above difficulties are eliminated.

The features and advantages of this invention will be made clear in the following description with reference to the accompanying drawings illustrating one preferred embodiment of this invention and wherein.

Figure 1:
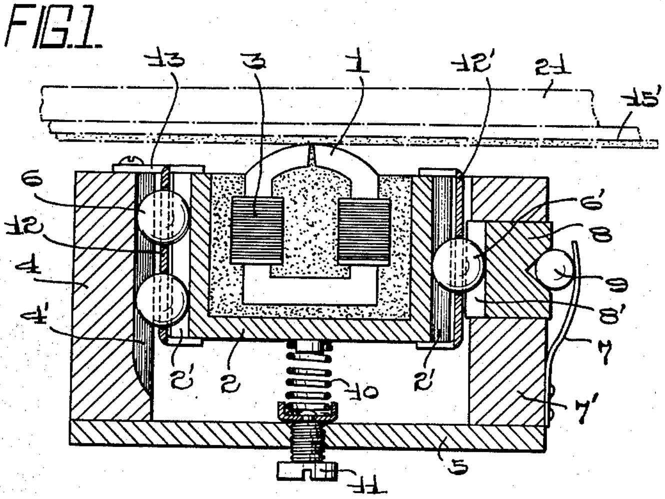
Fig. 1 is a longitudinal sectional front view of apparatus for supporting a magnetic sound recording and reproducing head according to the invention.
Figure 2:
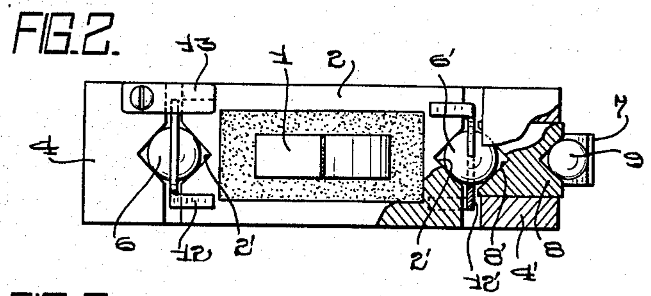
Fig. 2 is a plan view of the apparatus of Fig. 1 partly broken away.

As shown in the drawing, a sound recording head 1 having coils 3 is fixed in box 2. The box 2 is supported on a base plate 5 through an adjustment spring 10 the force of which is adjustable by means of an adjustment screw 11. The box 2 is movable vertically but is not movable to the side since one side 2′ of the box 2 bears against the surface of the wall of a post 4 fixed on the base plate 5 through balls 6 set in a vertical groove 2′ of V-shape formed on the outside surface of the side wall of the box 2 and a vertical groove 4′ formed on the inside surface of the post 4. The wall on the opposite side of the box 2 is pressed by a ball 6′ set in a vertical groove 2′ formed on the outside surface of the wall of the head box and a vertical groove 8′ formed on the inside surface of a pressing block 8 which is inserted in a hole formed in a post 7′ fixed on the base plate 5 and pressed inwardly by a spring 7 fixed on the post 4′ and acting on a ball 9.

In order to maintain the ball 6 and 6′ in proper positions, supporting plates 12 and 12′ having receptacles are fixed on the box 2 and the balls are maintained in the holes provided in said supporting plates. On the top of the post 4 is fixed a stop plate 13 which prevents the box from going beyond the top of the post 4.

It will be apparent from the construction as described above that the head 1 and the box 2 can move vertically very smoothly because of the presence of the balls 6 and 6′ in the V-shaped grooves and the spring 10 below the bottom of the box 2. The box cannot move horizontally because it is pressed by the spring 7 from one side. Further, the box is fixed against forward and rearward movement by the engagement of the balls 6 and 6′ inserted in the V-shaped grooves.

Figure 3:
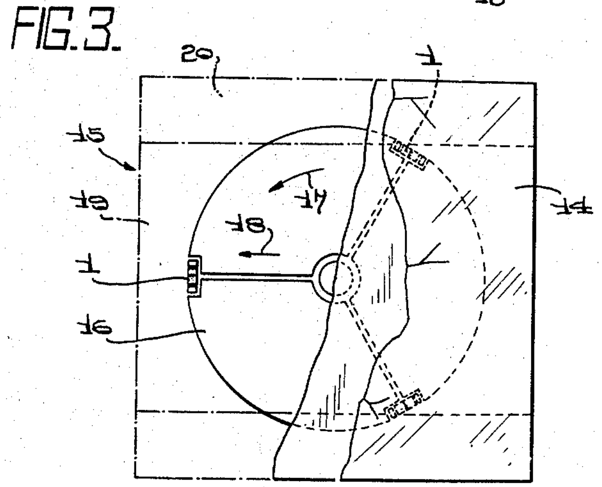
Fig. 3 is a plan view showing the arrangement of a magnetic sound record sheet on a magnetic sound machine having a turn table provided with magnetic sound recording and reproducing heads on the circumference.

In a magnetic sound record reading machine, a magnetic sound record sheet 15 is set with the magnetic sound record film facing downwardly on a frame (not shown). A transparent pressing plate 14 is placed on the sheet as shown in Fig. 3. A turn table 16 which is provided with heads 1 on the circumference is located below the magnetic sound record sheet 15 and is moved in the longitudinal linear direction of arrow 18 while roating in the direction of arrow 17 to scan sound tracks on the magnetic sound record film 19 on the sheet 15. On the surface of the sheet, there may be some difference in height along the demarcation lines of the magnetic sound record film 19 on the base carrier 20 and also some undulations or unevennesses, even if slight, on the relatively wide surface of the magnetic sound record film of the sheet. When a head as described above is used, the head will always be in initimate contact with the surface of the magnetic sound record sheet by virtue of the spring 10 so as to give satisfactory recording and reproducing of sound.

When the recording or reproducing of sound is to be made with a magnetic sound record tape, the tape 15′ is stretched to obtain contact with the surface of a pressing plate 21 as shown by chain lines in Fig. 1, and an intimate contact of the head 1 with the tape 15′ can be easily secured despite any rolling tendency or wrinkles and furrows in the tape 15′.

While this invention is explained with reference to one preferred embodiment of the invention in the above, it is obvious to those experienced in the art that the embodiment may be modified and altered in various ways, and that the invention is not limited to the illustrated embodiment but covers all modified and altered embodiments within the scope of claims.

What is claimed is:

1. Apparatus for magnetic sound recording and reproducing comprising a magnetic head, coils on said head, a box for housing said head, and receptacles on and externally of said box; said head, coils, box and receptacles being in fixed relation to each other and being movable as a unit; and support means supporting said unit for linear movement whereby said unit is movable toward and away from a magnetic record but is prevented from moving laterally with respect to the record; said means including fixed guides defining with said box parallel grooves, balls in said grooves and in the receptacles on said box so that said unit is movable therealong, a spring engaging said unit to urge the same in one direction in said grooves, and control means urging at least one of said balls transversely of said direction to avoid play in the guiding of said unit.

2. Apparatus for magnetic sound recording and reproducing comprising a magnetic head, a coil on said head, and a box for housing said head; said head, coil and box being in fixed relation to each other and being movable as a unit; and support means supporting said unit for linear movement whereby said unit is movable toward and away from a magnetic record but is prevented from moving laterally with respect to the record; said means including fixed guides defining with said box parallel V-shaped grooves, balls in said grooves so that said unit is movable therealong, a spring engaging said unit to urge the same in one direction in said grooves, means for limiting the movement of said unit relative to said guides, and control means urging at least one of said balls transversely of said direction to avoid play in the guiding of said unit.

3. Apparatus for magnetic sound recording and reproducing comprising a magnetic head, coils on said head, and a box for housing said head; said head, coils and box being in fixed relation to each other and being movable as a unit; and support means supporting said unit for linear movement whereby said unit is movable toward and away from a magnetic record but is prevented from moving laterally with respect to the record; said means including fixed guides defining with said box parallel grooves, balls in said grooves so that said unit is movable therealong, a spring engaging said unit to urge the same in one direction in said grooves, and control means urging at least one of said balls transversely of said direction to avoid play in the guiding of said unit.

4. Apparatus as claimed in claim 3, wherein said control means comprises a block in and slidable transversely of one of said guides, and a spring urging said block towards said box.

5. Apparatus as claimed in claim 4, wherein said block defines transverse grooves opening away from said box, one of said transverse grooves being aligned with the groove in said one guide, said control means further comprising a ball in the other of the transverse grooves of said block between the latter and the spring engaging the same.

References Cited in the file of this patent

UNITED STATES PATENTS

| | | |
|---|---|---|
| 1,817,021 | Schimpf | Aug. 4, 1931 |
| 2,103,361 | Guedon | Dec. 28, 1937 |
| 2,422,774 | Conner | June 24, 1947 |
| 2,422,775 | Conner | June 24, 1947 |
| 2,452,117 | Ferger | Oct. 26, 1948 |

FOREIGN PATENTS

| | | |
|---|---|---|
| 204,862 | Australia | June 16, 1955 |
| 732,906 | Germany | Mar. 15, 1943 |